United States Patent
Prost et al.

(10) Patent No.: US 7,556,076 B2
(45) Date of Patent: Jul. 7, 2009

(54) TIRE FOR TWO-WHEELED VEHICLE COMPRISING AN ANTI-VIBRATION MEANS

(75) Inventors: Pascal Prost, Riom (FR); Alain Valle, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/354,686

(22) Filed: Jan. 30, 2003

(65) Prior Publication Data

US 2003/0145935 A1    Aug. 7, 2003

Related U.S. Application Data

(63) Continuation of application No. PCT/EP01/08567, filed on Jul. 25, 2001.

(30) Foreign Application Priority Data

Jul. 31, 2000    (FR) ................... 00 10290

(51) Int. Cl.
- B60C 9/22    (2006.01)
- B60C 13/00   (2006.01)
- B29D 30/06   (2006.01)
- B29D 30/38   (2006.01)

(52) U.S. Cl. .............. 152/531; 152/533; 152/543; 152/550; 152/555; 156/117; 156/123

(58) Field of Classification Search ........... 152/531, 152/533, 555, 543, 550; 156/117, 123
See application file for complete search history.

(56) References Cited

U.S. PATENT DOCUMENTS

| | | | |
|---|---|---|---|
| 639,949 A * | 12/1899 | Swain et al. | |
| 1,243,576 A * | 10/1917 | Archer | 152/555 X |
| 3,044,523 A | 7/1962 | Drakeford et al. | |
| 3,072,171 A | 1/1963 | Drakeford et al. | |
| 4,166,491 A | 9/1979 | Mezzanotte | |
| 4,287,929 A | 9/1981 | Huinink | |
| 5,250,194 A | 10/1993 | Hollis et al. | |

(Continued)

FOREIGN PATENT DOCUMENTS

DE    35 35 188 A1 *    4/1986

(Continued)

OTHER PUBLICATIONS

International Search Report, PCT/EP01/08567, dated Sep. 26, 2001.

*Primary Examiner*—Adrienne C Johnstone
(74) *Attorney, Agent, or Firm*—Frank J. Campigotto; E. Martin Remick; Kurt J. Fugman (57) ABSTRACT

A tire comprising at least one reinforcement structure of carcass type anchored on either side of the tire in a bead, the base of which is intended to be mounted on a rim seat, each bead being extended radially outward by a sidewall, the sidewalls extending radially towards outward to join a tread, the reinforcement structure extending circumferentially from the bead towards said sidewall, an anchoring zone for the reinforcement structure, said tire furthermore comprising an anti-vibration means arranged circumferentially in the junction zone of the shoulder and the sidewall.

9 Claims, 6 Drawing Sheets

U.S. PATENT DOCUMENTS

| | | | |
|---|---|---|---|
| 5,529,104 A | 6/1996 | Delias et al. | |
| 5,660,656 A | 8/1997 | Herbelleauu et al. | |
| 5,988,246 A * | 11/1999 | Villani et al. | 152/531 X |
| 6,318,432 B1 | 11/2001 | Caretta et al. | |
| 7,238,248 B2 * | 7/2007 | Armellin | 152/555 X |
| 2004/0074580 A1 | 4/2004 | Caretta | |
| 2005/0061415 A1 * | 3/2005 | Armellin | 152/555 X |

FOREIGN PATENT DOCUMENTS

| | | | |
|---|---|---|---|
| EP | 0 507 184 A1 | | 10/1992 |
| EP | 0 697 813 | | 9/1997 |
| EP | 0 890 454 A2 | | 1/1999 |
| EP | 0 928 680 A1 | | 7/1999 |
| EP | 0 976 536 | | 2/2000 |
| EP | 1 080 948 | | 3/2001 |
| EP | 1 101 633 A1 | * | 5/2001 |
| GB | 992 631 | | 5/1965 |
| GB | 1 222 759 | * | 2/1971 |
| GB | 1222759 | | 2/1971 |
| GB | 2 121 737 A | * | 1/1984 |
| GB | 2121737 | | 1/1984 |
| JP | 59-38104 | | 3/1984 |
| JP | 60053404 A | * | 3/1985 |
| JP | 60240506 A | * | 11/1985 |
| JP | 05246210 A | * | 9/1993 |
| WO | WO-02/09956 A1 | * | 2/2002 |

* cited by examiner

TIRE FOR TWO-WHEELED VEHICLE COMPRISING AN ANTI-VIBRATION MEANS

CROSS-REFERENCE TO RELATED APPLICATIONS

This application is a continuation of International Application No. PCT/EP01/08567, filed Jul. 25, 2001 and further claims priority to French Patent Application No. 00/10290, filed Jul. 31, 2000.

BACKGROUND OF THE INVENTION

The present invention relates to tires. More particularly, it relates to a tire, in particular for a vehicle of the two-wheeled type, comprising an anti-vibration means.

In vehicles of the two-wheeled type, such as motorcycles, scooters and others, the different types of vibration such as those originating from the engine, from travel, imperfections in the road, etc, are difficult to dampen, so they are for the most part transmitted to the occupants of the vehicle. These vibrations may occur in the vertical, longitudinal or transverse directions. The result may be a certain amount of discomfort, which may itself be a source of fatigue if use is prolonged, in particular if the levels of vibrations are rather high.

The designers of such vehicles therefore use considerable means to tackle the problem of vibrations. The manufacturers of the various elements of the vehicle are not passive bystanders in this either, since each can contribute to a greater or lesser extent to attenuating or dampening the induced vibrations, or even better, to eliminate them at source. To this end, tire manufacturers may play a decisive part as far as the vibrations due to travelling and to imperfections in the road are concerned. The front tire may constitute a key element in this respect.

The reinforcement of the carcasses of tires at present consists of one or more plies (conventionally referred to as "carcass plies" owing to the process of manufacturing in the form of semi-finished products in the form of plies), provided with cord reinforcements which may be radial. The anchoring or holding of these plies or reinforcements is effected conventionally by turning up a portion of the ply around a bead wire arranged in the bead of the tire.

Furthermore, there are nowadays tires that do not have the conventional upturn of the carcass ply around a bead wire, or even a bead wire, in the conventional sense of this element. For example, document EP 0 582 196 describes a manner of arranging a carcass type reinforcement in the beads, by arranging circumferential filaments adjacent to said reinforcement structure, the whole being embedded in an anchoring or bonding rubber mix, preferably of high modulus of elasticity. Several arrangements are proposed in this document. This document furthermore makes reference to tires manufactured without the aid of semi-finished products in the form of plies. For example, the cords of the different reinforcement structures are applied directly to the adjacent layers of rubber mixes, and are applied in successive layers on a core. The core has a shape that makes it possible to obtain directly a profile similar to the final profile of the tire being manufactured. Thus, in this case, rather than "carcass plies" in the conventional sense, we have more specifically "reinforcements of carcass type." This term, which in fact designates the reinforcements of one or the other type, will be used in the present document.

SUMMARY OF THE INVENTION

The present invention is therefore directed at providing a tire, in particular a tire for a front wheel of a vehicle of the two-wheeled type, having improved performance with regard to the vibratory behavior, in particular the shimmy.

To do this, the invention provides a tire for a two-wheeled vehicle comprising:
at least one reinforcement structure of carcass type anchored on either side of the tire in a bead the base of which is intended to be mounted on a rim seat, each bead being extended radially towards the outside by a sidewall, the reinforcement structure extending circumferentially from the beads towards said sidewalls, the sidewalls joining radially towards the outside a tread, and having a ratio Ht/Wt which is greater than 0.15;
an anchoring zone for the reinforcement structure,
a transition zone corresponding substantially to the change from the lateral portion of the tread to the sidewall;
an anti-vibration means arranged circumferentially in said transition zone and extending substantially radially outward towards the crown and extending substantially radially inward in the sidewall; said anti-vibration means comprising at least one alignment of substantially circumferential cords.

The transition zone, starting from the location where the radius defined by the meridian profile of the tread changes suddenly to intersect the path of the tread, constitutes a major specific feature of the tire for two-wheeled vehicles. No aspect of a conventional tire profile for a vehicle having four wheels or more can be compared with the tire profile for a two-wheeled vehicle of the four-wheeled vehicle tire, owing to the design of the vehicles on which it is fitted, generally has a substantially flat tread, or a tread of low radius.

For a two-wheeled vehicle, the contact zone between the ground and the tire is substantially narrow compared with the width of the tread. This zone is furthermore mobile along the profile of the tread, according to the inclination of the motorcycle. This is all the more important since the dynamic stresses differ greatly between two-wheeled vehicles and other types of vehicles. This justifies, for example, the presence of different tires for the front wheel and the rear wheel of a large number of motorcycles.

According to conventional practice, generally increasing the rigidity of the transition or o inflexion zone is avoided since all the rigidities are then adversely affected. This results in a reduction in comfort and durability to impermissible levels. According to the invention, the presence of the anti-vibration means at a precise location and its original structure make it possible to affect in particular the transverse rigidity, without having a significantly adverse effect on the radial and longitudinal rigidity. This is a major characteristic, which makes it possible to fight the phenomenon of shimmy in a truly effective manner. The subject of the present invention is therefore intended above all for use on the front wheel of a two-wheeled vehicle. It may furthermore also be used for the rear wheel or for both.

The material constituting the cord(s) of the winding of the anti-vibration means (for example aramide, metal, glass fiber, polyester, etc), the types of rubber mixes in which the cords are arranged, the density of the cords and the number of windings, affects the transverse rigidity of the tire while retaining substantially a certain stability of the other rigidities of the tire such as the vertical and longitudinal rigidity. The anti-vibration means therefore permits separation of the transverse rigidity from the other rigidities. Furthermore, favorable results are obtained for vibrations such as kick-back, waving, stability of the profile to centrifugation (wear, stability), etc.

Advantageously, the anti-vibration means ensures a mechanical connection or cooperation between the lateral portion of the tread and the portion of the sidewall in which said means is arranged. It is this mechanical connection which contributes to stiffening the tire in the transverse direction. In this manner, the amplitude and the frequency of the shimmy are influenced directly.

Advantageously, said anti-vibration means comprises at least one cord aligned substantially circumferentially, or a series de cords aligned and distributed circumferentially. Preferably, the angle of the cords is substantially 0° relative to the circumferential direction. The cords thus form alignments that may assume a large number of shapes. The alignments of cords may also be arranged and manufactured in several ways. For example, an alignment may advantageously be formed of a single cord wound (substantially at zero degrees) in a spiral over several turns, preferably from the smallest diameter towards the largest diameter. It may also be formed of a plurality of concentric cords laid one in another, forming superposed rings of gradually increasing diameters. It is not necessary to add a rubber mix to ensure the impregnation of the cord or of the circumferential windings of cord.

Owing to the use of different types of cords, with different properties or different materials, each at a specific point, the characteristics of the sidewall and/or of the lower zone of the tire can be optimized.

The present invention also provides for the use of a substantially peripheral anti-vibration means to reduce the generation of shimmy-type vibrations of the in a tire for a two-wheeled vehicle comprising at least one reinforcement structure of carcass type anchored on either side of the tire in a bead the base of which is intended to be mounted on a rim seat, each bead being extended radially towards the outside by a sidewall, the sidewalls joining radially towards the outside a tread, and having a Ht/Wt ratio which is greater than 0.15, the reinforcement structure extending circumferentially from the beads towards said sidewalls. The tire further comprises a transition zone corresponding substantially to the change from the lateral portion of the tread to the sidewall; said anti-vibration means being arranged circumferentially in said transition zone and extending radially substantially radially outward towards the crown and extending substantially radially inward in the sidewall.

Within the scope of this use, the anti-vibration means advantageously comprises at least one alignment of substantially circumferential cords. Furthermore, this anti-vibration means advantageously ensures a mechanical connection between the lateral portion of the tread and the portion of the sidewall in which said means is arranged. It is this mechanical connection which contributes to stiffening the tire in the transverse direction. In this manner, the amplitude and the frequency of the shimmy are influenced directly.

An anti-vibration means of this type is advantageously used in a tire in which the reinforcement structure of carcass type is anchored in the bead owing to at least one arrangement of anchoring cords in a substantially circumferential path arranged substantially adjacent to said structure. However, the anti-vibration means may also be used with a conventional tire, comprising a bead wire around which a carcass is turned up, as illustrated for example in FIG. 4.

The anti-vibration means advantageously consists of at least one cord aligned substantially circumferentially, or alternatively a series de cords aligned and distributed circumferentially. An alignment may comprise one or more cords. The alignments of cords may be arranged and manufactured in several ways. For example, an alignment may advantageously be formed of a single cord wound (substantially at zero degrees) in a spiral over several turns, preferably from the smallest diameter towards the largest diameter. It may also be formed of a plurality of concentric cords laid one in another, forming superposed rings of gradually increasing diameters. It is not necessary to add a rubber mix to ensure the impregnation of the cord or of the circumferential windings of cord.

In order to contribute to optimizing the lateral rigidity of the tire, provision may also be made for a single, double, or even triple alignment of cords, according to the type of tire and the vibratory behavior desired.

Part or all of the cords of the alignment is/are advantageously non-metallic, and preferably of textile type, such as cords based on aramide, aromatic polyester, or alternatively other types of cords of various moduli such as cords based on PET, PEN, PVA, glass fiber, nylon, rayon, etc, or alternatively of hybrid type, for example of aramide/nylon type.

Advantageously, at least one alignment comprises a plurality of cords, at least two of which have different characteristics. It is also possible to provide cords of different nature and/or characteristics in separate alignments.

"Characteristics of the cord" is understood to mean, for example, its dimensions, its composition, its characteristics and mechanical properties (in particular the modulus or the tenacity), its chemical characteristics and properties, etc.

Advantageously, the alignments of cords are arranged so as to be in contact with at least one rubber mix of high modulus. In an advantageous example, the alignments are surrounded on a first side by a first mix and on the other side by a second mix.

Preferably, the circumferentially oriented cords are not in direct contact with the radially oriented cords, for example those of the carcass-type structure.

The present invention furthermore provides a reinforcement structure for tires. It is furthermore desirable for this structure to lend itself easily to automated manufacture.

The present invention also provides a type of arrangement of the different constituent elements of a tire in order to be able to refine certain characteristics such as the rigidity, impact resistance, etc.

Finally, the present invention provides a tire reinforcement structure that takes into account the different mechanical stresses occurring in the different zones of the sidewall and the shoulder during operation, in particular at rated pressure.

BRIEF DESCRIPTION OF THE DRAWINGS

All the details of several embodiments are given in the following description, supplemented by FIGS. 1 to 10, in which.

DETAILED DESCRIPTION OF THE INVENTION

In the present specification, the term "cord" designates very generally both monofilaments and multifilaments, or assemblies such as cables, plied yarns or alternatively any type of equivalent assembly, and this, whatever the material and the treatment of these cords, for example surface treatment or coating or pre-sizing to promote adhesion to the rubber. "Radially outward" or "radially upper" means towards the largest radii. "Elasticity modulus" of a rubber mix is understood to mean a secant modulus of extension obtained at a uniaxial deformation of extension of the order of 10% at ambient temperature.

A reinforcement or reinforcing structure of carcass type will be said to be radial when its cords are arranged at 90°, but also, according to the terminology in use, at an angle close to 90°.

It is known in the prior art that carcass ply or plies is/are turned up about a bead wire. The bead wire then performs the function of anchoring the carcass, that is to say, takes up the tension that develops in the carcass cords under the action of the inflation pressure. In the configurations described in the present application, which advantageously do not use a bead wire of conventional type, the function of anchoring the reinforcement structure of carcass type is also ensured.

It is also known in the prior art, that the same bead wire furthermore performs a function of clamping the bead on its rim. In the examples of embodiment described in the present application which do not use a bead wire of conventional type, the clamping function is also ensured, in particular by the circumferential windings of cords closest to the seat.

It goes without saying that the invention can be used by adding other elements to the bead or to the lower zone of the tire in general, as some variants will illustrate. Likewise, the invention can be used by multiplying the reinforcement structures of the same type, or even by adding another type of reinforcement structure.

Figure 1:
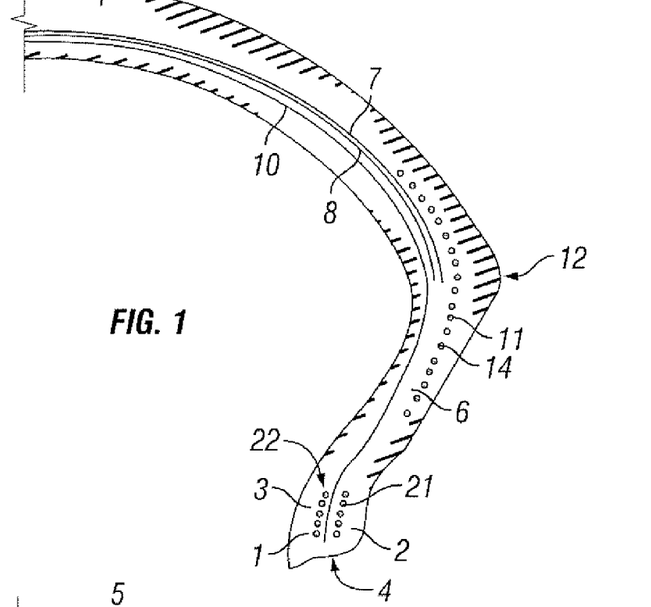
FIG. 1 is a radial section showing a sidewall and a bead of a first form of embodiment of a tire according to the invention.

FIG. 1 shows the lower zone, in particular the bead 1 of a first form of embodiment of the tire according to the invention. The bead 1 comprises an axially outer portion 2 that is provided and shaped so as to be placed against the flange of a rim. The portion 2 ends radially and axially towards the inside in a bead seat 4 that is adapted to be placed against a rim seat. The bead also comprises an axially inner portion 3, which extends substantially radially from the seat 4 towards the sidewall 6.

The tire also comprises a reinforcement or reinforcing structure 10 of carcass type provided with reinforcements that are advantageously shaped in a substantially radial arrangement. This structure may be arranged continuously from one bead to the other, passing through the sidewalls and the crown of the tire, or alternatively it may comprise two or more parts, arranged for example along the sidewalls, without covering the entire crown.

The region of the crown 5 preferably comprises a reinforcement structure such as, for example, an arrangement of plies 7 and 8 which are crossed at the crown.

To position the reinforcement cords as accurately as possible, and to optimize the effectiveness of the winding by ensuring that the cables are in extension in the tire, it is very advantageous to build the tire on a rigid support, for example a rigid core which imposes the shape of the inner cavity. There are applied to this core, in the order required by the final architecture, all the constituents of the tire, which are arranged directly in their final position, without the profile of the tire having to be modified during building.

Circumferential cords 21 preferably arranged in the form of stacks 22 form an arrangement of main cords 20 or anchoring cords, which is provided in each of the beads. These cords are preferably metallic, and possibly brass-coated. In each stack, the cords are advantageously substantially concentric and superposed.

To ensure perfect anchoring of the reinforcement structure, a stratified composite bead is produced. Within the bead 1, between the cord alignments of the reinforcement structure, there are arranged circumferentially oriented cords. These are arranged in a stack as in the drawings, or in a plurality of adjacent stacks, or in packets, or in any suitable arrangement, depending on the type of tire and/or the desired characteristics.

The radially inner end portions of the reinforcement structure 10 cooperate with the beads. Anchoring of these portions in said beads is thus created. In order to promote this anchoring, the space between the circumferential cords and the reinforcement structure is occupied by a bonding rubber mix. It is also possible to provide for the use of a plurality of mixes having different characteristics, defining a plurality of zones, the combinations of mixes and the resultant arrangements being virtually unlimited. However, it is advantageous to provide for the presence of a mix of high elasticity modulus in the zone of intersection between the arrangement of cords and the reinforcement structure. By way of non-limiting example, the elasticity modulus of such a mix may reach or even exceed 15 or 20 MPa, and even in some cases reach or even exceed 40 MPa.

It is also possible to use the different elements of the present invention with a conventional carcass ply arrangement, the base of which is partially wound or turned up, at the level of the bead, against a bead wire, usually formed of a plurality of filaments arranged so as to form a cable.

The different examples shown in FIGS. 1 to 9 make it possible to illustrate the anti-vibration means 11 according to the invention. This anti-vibration means extends substantially radially preferably between the region of the shoulder towards the region of the sidewall. It comprises at least one arrangement of cords 14 extending substantially circumferentially.

This anti-vibration means is particularly suitable for a tire of the two-wheeled type, such as for a motorcycle or a scooter, this type of vehicle being more subject to the phenomenon of shimmy than a vehicle such as a car or a lorry, simply due to the very design of the two-wheeled vehicle, which is more sensitive to the phenomena of vibrations or imbalances.

The invention also takes into consideration the important specific features of the tire intended for a motorized two-wheeled vehicle such as a motorcycle or a scooter or a moped. For example, such a tire usually has a tread extending, in a meridian plane, between the two points defining the greatest axial distance. Given the greatly inclined angles likely to be generated for example when taking curves at high speed, the tread of the tire for a two-wheeled vehicle also has an "arched" or rounded shape, with a Ht/Wt ratio generally greater than 0.15 and preferably greater than 0.3, which is characteristic of this type of tire. The Ht/Wt ratio represents the ratio of the height of the tread Ht to its width Wt, as illustrated in FIG. 10C. These characteristics mean that, for example, the junction between the crown and the sidewall of a tire for two-wheeled vehicles is neither positioned nor configured in the same manner as for a tire for a vehicle having four or more wheels.

The arrangements of cords 14 may be arranged and manufactured in several ways. For example, a stack may advantageously be formed of a single cord wound (substantially at zero degrees) in a spiral over several turns, preferably from the smallest diameter towards the largest diameter. A stack may also be formed of a plurality of concentric cords laid one in another, forming superposed rings of gradually increasing diameters. It is not necessary to add a rubber mix to ensure the impregnation of the reinforcement cord or of the circumferential windings of cord. The arrangement of cords may be extended substantially radially along the sidewall or the shoulder or a portion thereof.

In the example of FIG. 1, the tire comprises an arrangement of cords 14 formed of a stack of juxtaposed cords. They are advantageously arranged in the immediate vicinity of the reinforcement structure 10. The structure illustrated in FIG. 1 is particularly simplified and simple to produce. The arrangement is preferably positioned or aligned radially at the level of the transition zone 12 of the tire, that is to say, the zone where the tread ends and the sidewall begins. For tires for two-wheeled vehicles, it is in fact this zone which corresponds generally to the greatest radial distance of the meridian profile. Preferably, as illustrated in the example of FIG. 1, the cords are substantially also distributed radially on both sides of the transition zone 12 of the tire. Furthermore, in this same example, the cords 14 are advantageously arranged axially externally relative to the reinforcement structure 10.

According to several advantageous variants, the number of windings, the radial spacing and the radial position of the arrangement may vary in an infinite number of possibilities. These characteristics are defined as a function of the vibratory behavior desired, of the type of vehicle and the conditions of use of the latter.

Figure 2:
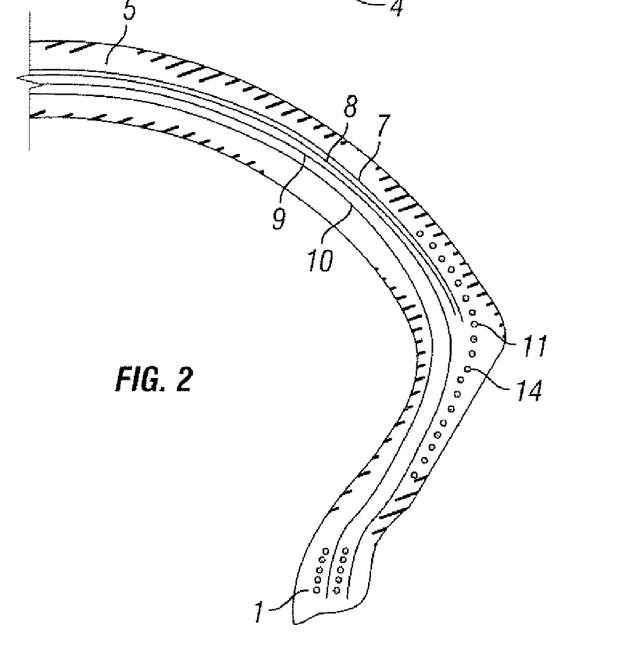
FIG. 2 is a radial section showing a sidewall and a bead of a second form of embodiment of a tire according to the invention.

The following figures (FIGS. 2 to 9) illustrate embodiments of the invention comprising preferably two reinforcement structures of carcass type 9 and 10. For example, FIG. 2 illustrates an embodiment comparable to the example of FIG. 1, but comprising two reinforcement structures of carcass type anchored in the bead 1. The angles of these structures may for example be variable from the crown 5 towards the equator 12 and also towards the lower or bead zone of the tire.

The rigidity of the tire may be modified by acting on the nature of the cords 14, their pitch, their position, their angle, etc., which may make it possible to achieve original compromises in terms of rigidity. For example, the separation of the vertical, lateral and drift rigidities permits new compromises in terms of performance in the fields of shimmy, but also of behavior in general, comfort, wear and endurance.

Figure 3:
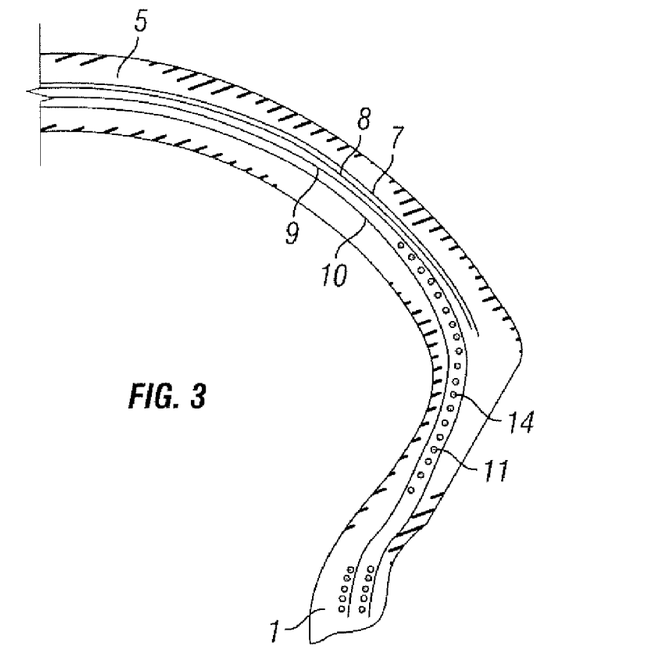
FIG. 3 is a radial section showing a sidewall and a bead of a variant of the form of embodiment of the tire of FIG. 2.

The variant illustrated in FIG. 3 is distinguished by the fact that the anti-vibration means 11 is arranged between the reinforcement structures of carcass type 9 and 10.

Figure 4:
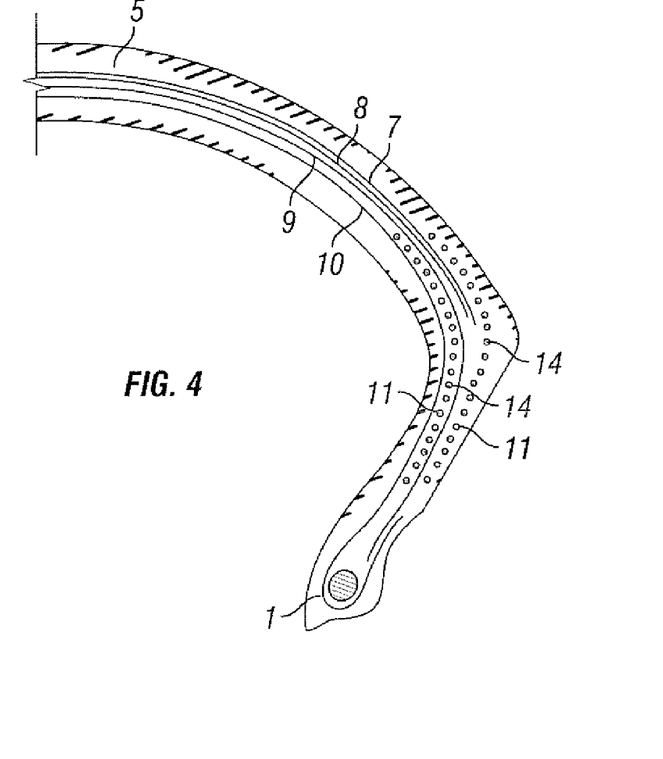
FIG. 4 is a radial section showing a sidewall and a bead of another variant of the form of embodiment of the tire of FIG. 2.

The variant illustrated in FIG. 4 is distinguished by the fact that the anti-vibration means 11 is divided into two over at least a portion of the profile of the tire, or, in other words, that the side of the tire has two anti-vibration means 1 arranged either between the reinforcement structures of carcass type 9 and 10, or on one or the other side of the reinforcements 9 or 10. Such a division may make it possible to place a certain emphasis on some properties such that the benefit obtained by certain of the advantages referred to above can be increased still further.

Figure 5:
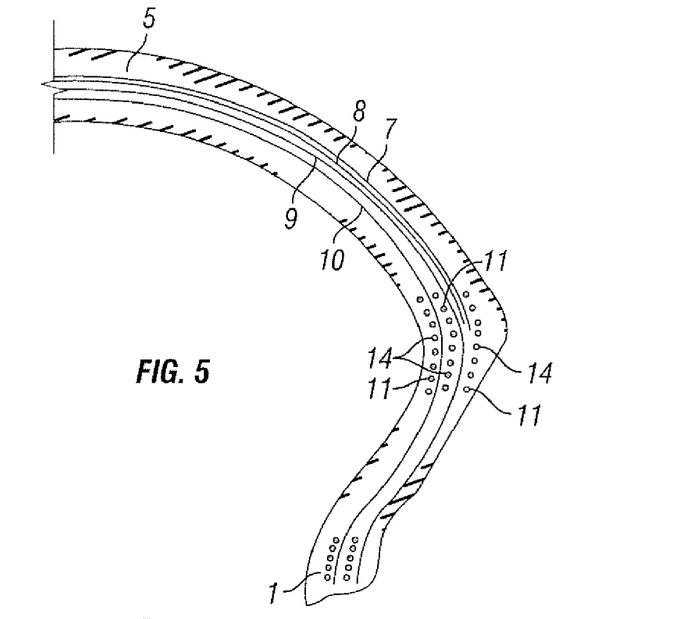
FIG. 5 is a radial section showing a sidewall and a bead of another variant of the form of embodiment of the tire of FIG. 2.

The variant illustrated in FIG. 5 is distinguished by the fact that the anti-vibration means 11 is trebled over at least a portion of the profile of the tire, or, in other words, that the side of the tire has three anti-vibration means 11 arranged firstly between the reinforcement structures of carcass type 9 and 10, and secondly on the axially inner side of the innermost structure 10 and on the axially outer side of the outermost structure 9.

Figure 6:
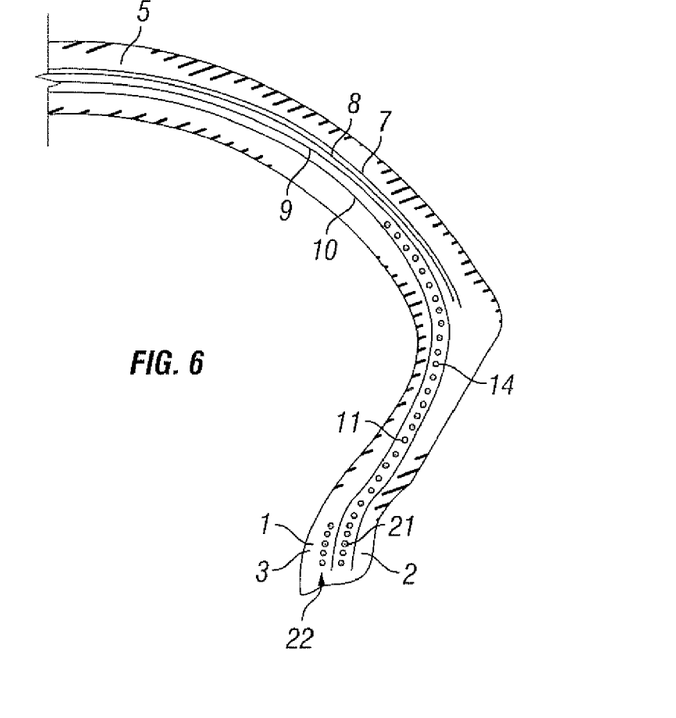
FIG. 6 is a radial section showing a sidewall and a bead of another variant of the form of embodiment of the tire of FIG. 2.
Figure 7:
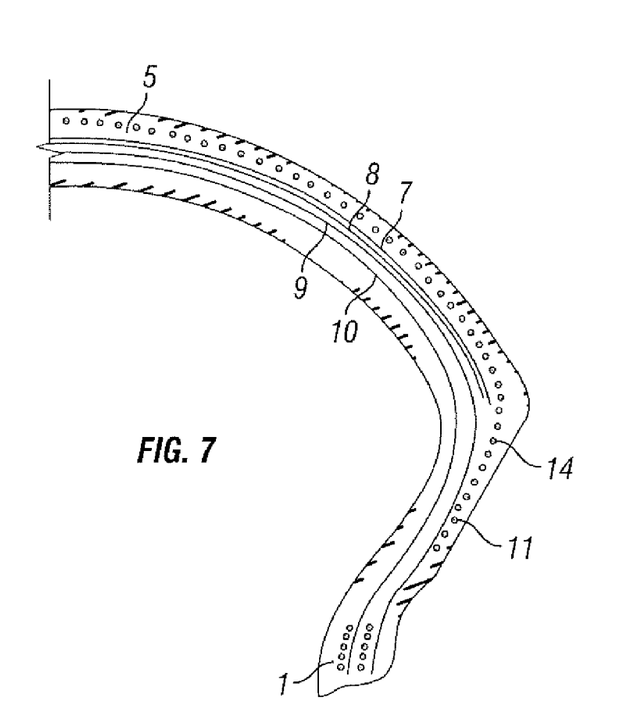
FIG. 7 is a radial section showing a sidewall and a bead of another variant of the form of embodiment of the tire of FIG. 2.

FIGS. 6 and 7 illustrate variants in which the cord windings of the anti-vibration means 11 are extended respectively radially internally as far as the bead in the case of FIG. 6 and radially externally as far as the median portion of the crown 5, in the case of FIG. 7. In the first of these two cases, when the anchoring of the reinforcement structure of carcass type is effected by means of circumferential cords 21 arranged in the immediate vicinity of the reinforcement structure in cooperation with a rubber mix of high modulus (such as, for example, greater than 15, or even than 40 MPa), the cords 14 of the anti-vibration means 11 may be arranged so as to form a substantially radial alignment in continuity with an alignment of the anchoring zone.

In the second case (FIG. 7), the circumferential cords arranged in the median zone of the crown 5 contribute to imparting greater resistance to centrifugation.

Figure 8:
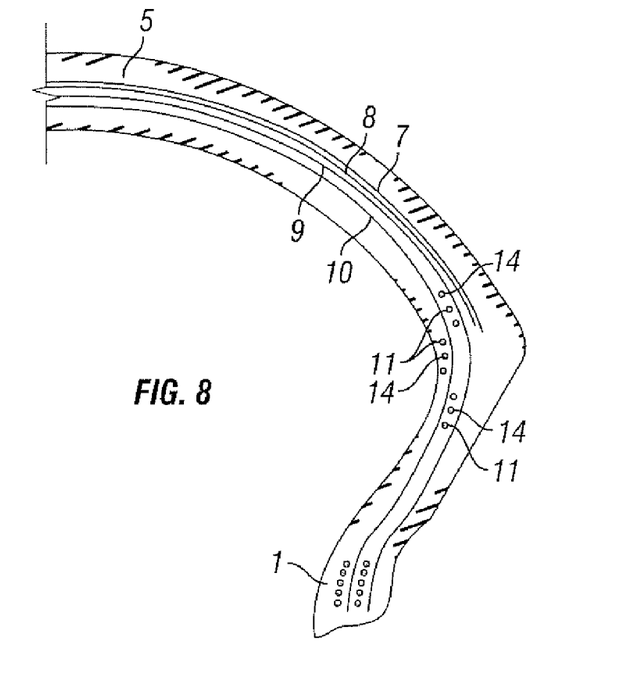
FIG. 8 is a radial section showing a sidewall and a bead of a variant of the form of embodiment of the tire of FIG. 2.

FIG. 8 illustrates another variant in which the cords 14 of the means 11 are arranged alternately on either side of a reinforcement structure 10 or 9. In the example illustrated, moving radially upwards, there will be noted an alternation with first of all three windings between the two structures 9 and 10, three radially inner windings, then again three windings between the structures 9 and 10. Of course, many variants of this example may be produced, by changing for example the number of cords of each series, using different numbers of cords and/or series of cords, etc. The alternation can also be effected with a single reinforcement structure 10 or alternatively on either side of several structures.

Figure 9:
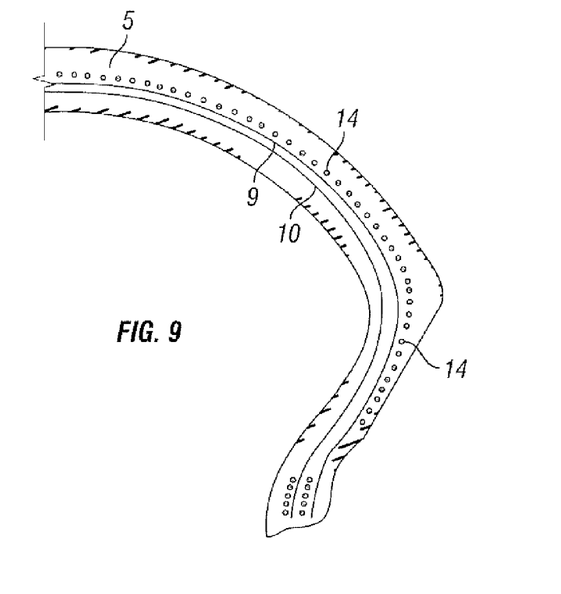
FIG. 9 is a radial section showing a sidewall and a bead of a variant of the form of embodiment of the tire of FIG. 2.

FIG. 9 illustrates a variant of the form of embodiment of FIG. 7, in which the crown plies 7 and 8 have been omitted. The presence of cords 14 as far as the median portion of the crown makes it possible to ensure the required characteristics both at the level of resistance and of performance. The reinforcement structures 9 and 10 may have a given crossing angle.

Figure 10A:
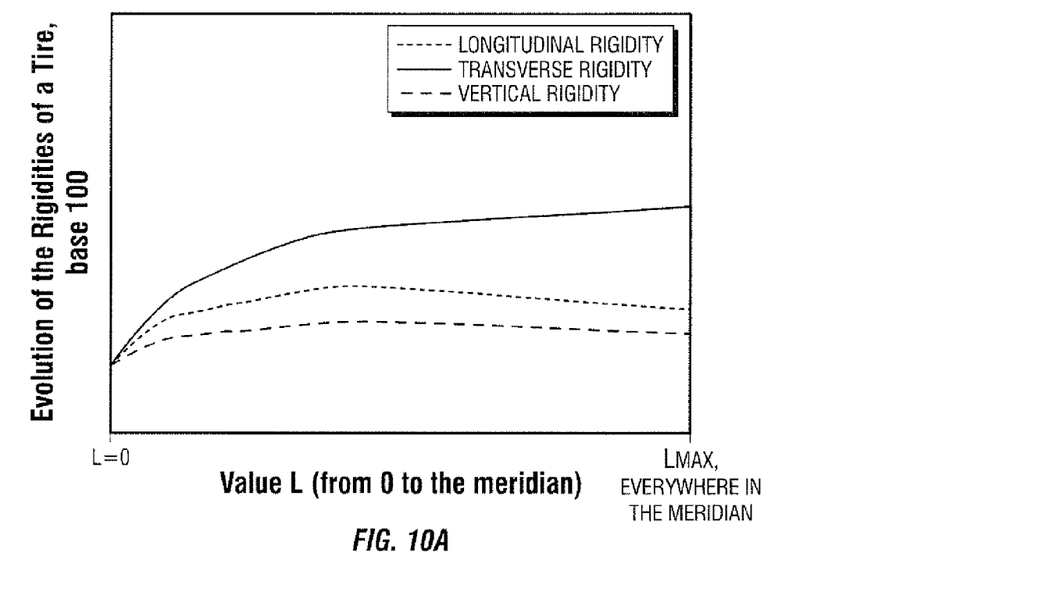
FIGS. 10a, 10b and 10c illustrate, by means of graphs, the evolution of the rigidities of a tire (on a base of 100) relative to a given length L.
Figure 10B:
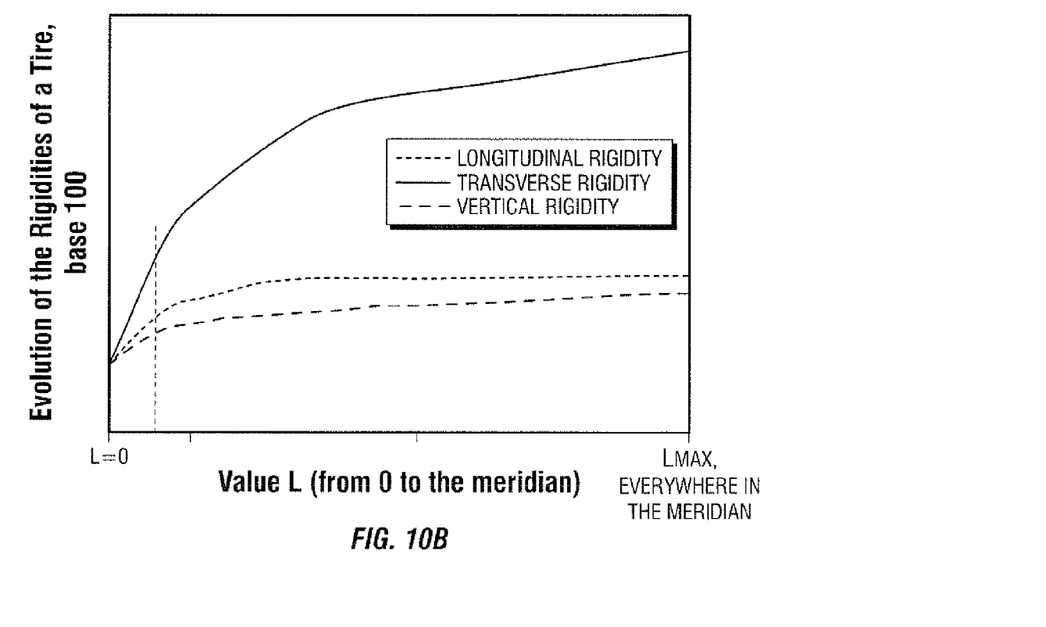
Figure 10C:
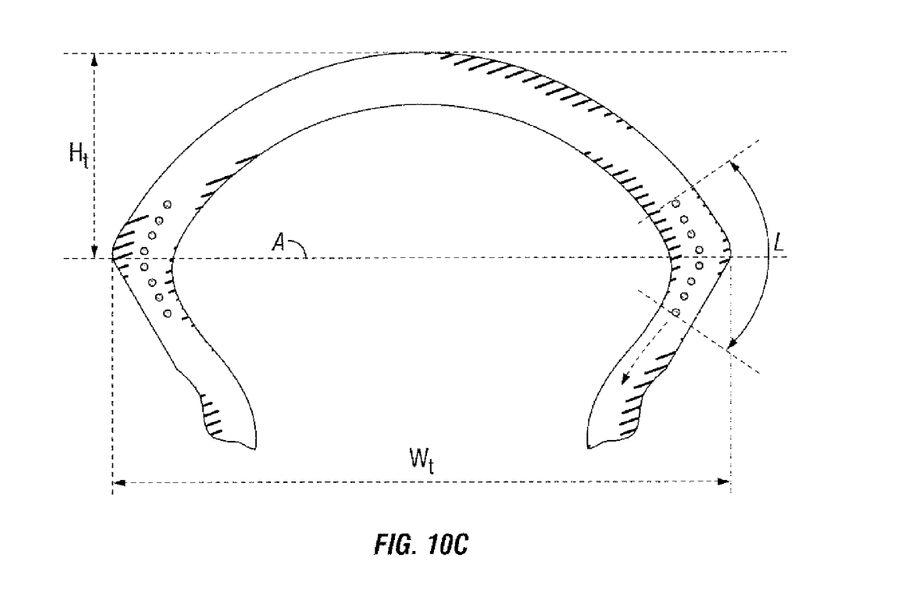

FIGS. 10a and 10b show graphs showing the change in the rigidities of the tire (with base 100) as a function of the circumferential distance L between the end cords of the anti-vibration means. This dimension is illustrated in FIG. 10c. These results are based on a study of a tire for a vehicle of the two-wheeled type comprising plies that are crossed at the crown.

FIG. 10a shows the evolution for a tire with cords 14 based on aramide, whereas FIG. 10b shows the evolution for a tire with cords 14 based on steel. These graphs clearly illustrate the disconnection between the different types of rigidity. Thus, as a function of the length L, an increase in the transverse rigidity of the tire can be obtained, while maintaining a certain stability of the rigidities of the tire in the other two directions (vertical and longitudinal). This effect is more outstanding still with the use of cords of steel type (FIG. 10b) than with cords of aramide type (FIG. 10a).

Other parameters may also influence the adjustment, such as, for example, the quality of the rubber mixes, the density of the cords, etc. Owing to these different evolutions of the rigidities, it becomes possible to proportion the parameters in order to improve the compromise in terms of overall performance of the tire in the fields of behavior and comfort, which are of particular importance for tires intended for vehicles of the two-wheeled type. In particular, it is possible to improve considerably the abilities of the tire with respect to the shimmy, without compromising the comfort or other types of performance of the tire.

According to another variant (not shown), the tire comprises a zone of bonding rubber mix arranged over at least a portion of the path of the arrangements of cords. This mix is advantageously arranged so as to be in direct contact on one hand with at least a portion of the anti-vibration means and on the other hand with a substantially adjacent portion of reinforcement structure of carcass type. It is preferably a rubber mix of substantially high modulus (such as, for example a modulus greater than 15 MPa or even greater). The bonding mix makes it possible to optimize the operation between the beginning of the crown and the substantially adjacent portion of the sidewall. In the conventional configurations in which the cords are applied in the form of plies, (cord impregnated in a layer of rubber mix), there results a thin intermediate layer of mix of lower modulus which is between the mix of high modulus and the portion of reinforcement structure. With direct contact, therefore without the presence of this thin layer of mix of lower modulus, the impact of the presence of the mix of high modulus in the zone is amplified. In fact, the traditional thin layer of lower modulus causes losses of energy, which may cause deterioration of the mechanical properties.

By modifying the thickness of the zone and/or by using a mix with a more or less high modulus, a tire with the desired characteristics, which are suited for the intended use, can be obtained.

The invention claimed is:

1. A motorcycle tire, comprising:
   at least one reinforcement structure of carcass type anchored on either side of the tire in a bead the base of which is intended to be mounted on a rim seat, each bead being extended radially towards the outside by a sidewall, the reinforcement structure extending circumferentially from the beads towards said sidewalls, the sidewalls extending radially outward to join a tread and said tread forming a crown, said tread having a height Ht and a width Wt;
   an anchoring zone for the reinforcement structure;
   a transition zone corresponding substantially to the change from the lateral portion of the tread to the sidewall;
   an anti-vibration means arranged circumferentially in said transition zone and extending substantially radially outward towards said crown to at least about 10% of a total distance from the transition zone to a median of the crown and extending substantially radially inward in said sidewall to terminate at a distance in the range of about 10% to about 30% of a total distance from the transition zone to the bead base line; said anti-vibration means comprising at least one alignment of substantially circumferential cords.

2. The motorcycle tire of claim 1, further comprising at least one arrangement of cords along a substantially circumferential path, arranged substantially adjacent to said reinforcement structure at the radial level of said bead.

3. The motorcycle tire of claim 1, in which said crown comprises a series of cords which are arranged substantially at zero degrees.

4. The motorcycle tire of claim 1, wherein the crown further comprises a reinforcing structure arranged radially outward from the reinforcement structure of carcass type, wherein the at least one alignment of substantially circumferential cords that extends radially outward towards the crown is arranged radially outward from the crown reinforcing structure.

5. The motorcycle tire of claim 1, wherein the anti-vibration means extends substantially radially outward towards said crown to at least about 15% of a total distance from the transition zone to a median of the crown.

6. The motorcycle tire of claim 1, wherein the anti-vibration means extends substantially radially outward towards said crown to at least about 20% of a total distance from the transition zone to a median of the crown.

7. A method to reduce the generation of shimmy type vibrations in a motorcycle tire comprising the steps of:
   providing the motorcycle tire comprising at least one reinforcement structure of carcass type anchored on either side of the tire in a bead the base of which is intended to be mounted on a rim seat, each bead being extended radially outward by a sidewall, said sidewalls extending radially outward to a tread and said tread forming a crown, and said tread having a height Ut and a width Wt, the reinforcement structure extending circumferentially from the beads towards said sidewalls, said tire also comprising a transition zone corresponding substantially to the change from the lateral portion of said tread to said sidewall;
   arranging an anti-vibration means circumferentially in said transition zone and extending substantially radially outwards towards said crown to at least about 10% of a total distance from the transition zone to a median of the crown and extending substantially radially inward in said sidewall to terminate at a distance in the range of about 10% to about 30% of a total distance from the transition zone to the bead base line, wherein the anti-vibration means comprises at least one alignment of substantially circumferential cords.

8. The method of claim 7, comprising:
   arranging the anti-vibration means circumferentially in said transition zone and extending substantially radially outwards towards said crown to at least about 15% of a total distance from the transition zone to a median of the crown.

9. The method of claim 7, comprising:
   arranging the anti-vibration means circumferentially in said transition zone and extending substantially radially outwards towards said crown to at least about 20% of a total distance from the transition zone to a median of the crown.

* * * * *